US008561783B2

(12) United States Patent
McAllister et al.

(10) Patent No.: US 8,561,783 B2
(45) Date of Patent: Oct. 22, 2013

(54) ADJUSTABLE STAR WHEEL

(75) Inventors: Mark McAllister, Tullibody (GB); Ian Spence, Gartcosh (GB)

(73) Assignee: Zepf Technologies UK Limited, Cumbernauld (GB)

( * ) Notice: Subject to any disclaimer, the term of this patent is extended or adjusted under 35 U.S.C. 154(b) by 681 days.

(21) Appl. No.: 12/679,418

(22) PCT Filed: Sep. 24, 2008

(86) PCT No.: PCT/GB2008/003250
§ 371 (c)(1),
(2), (4) Date: Apr. 26, 2010

(87) PCT Pub. No.: WO2009/040531
PCT Pub. Date: Apr. 2, 2009

(65) Prior Publication Data
US 2010/0193331 A1    Aug. 5, 2010

(30) Foreign Application Priority Data
Sep. 24, 2007  (GB) .................................. 0718658.8

(51) Int. Cl.
*B65G 47/84*  (2006.01)
(52) U.S. Cl.
USPC .................... 198/473.1; 198/480.1; 198/723; 198/867.07; 198/803.11
(58) Field of Classification Search
USPC .......... 197/473.1, 480.1, 723, 867.07, 803.11
See application file for complete search history.

(56) References Cited

U.S. PATENT DOCUMENTS

| 3,599,780 A | * | 8/1971 | Sorbie ...................... 198/803.11 |
| 4,124,112 A | * | 11/1978 | Mohney et al. ............... 198/394 |
| 4,467,908 A | | 8/1984 | Schneider |
| 5,046,599 A | * | 9/1991 | Hamano .................... 198/481.1 |
| 5,056,650 A | * | 10/1991 | Kronseder .................... 198/723 |
| 5,058,731 A | | 10/1991 | Corniani et al. |
| 5,082,105 A | * | 1/1992 | Tincati ....................... 198/473.1 |
| 5,123,518 A | * | 6/1992 | Pfaff .......................... 198/480.1 |

(Continued)

FOREIGN PATENT DOCUMENTS

EP   0 401 698 A   12/1990
EP   0 412 059 A    2/1991

(Continued)

OTHER PUBLICATIONS

International Preliminary Report on Patentability for International Appl. No. PCT/GB2008/003250 mailed Apr. 1, 2010.

(Continued)

*Primary Examiner* — Joseph A Dillon, Jr.
(74) *Attorney, Agent, or Firm* — Alston & Bird LLP

(57) ABSTRACT

The present invention provides an adjustable star wheel provided with at least one interchangeable pocket for receiving a container to be conveyed. The star wheel comprises a larger pocket of fixed shape and size, moveable jaws defining a smaller pocket having a fixed shape and size, an actuator disc rotatable about the central axis, and a cam mechanism linking the jaws to the actuator disc to cause radial movement of the jaws. In an extended position, the jaws move the smaller pocket into coincidence with the larger pocket thereby configuring the star wheel to receive containers in the smaller pocket. In the retracted position, the jaws are clear of the larger pocket thereby configuring the star wheel to receive containers in the larger pocket.

20 Claims, 6 Drawing Sheets

(56) References Cited

U.S. PATENT DOCUMENTS

| | | | | |
|---|---|---|---|---|
| 5,762,116 | A | * | 6/1998 | Moore .......................... 141/145 |
| 6,279,725 | B1 | * | 8/2001 | McBrady et al. .......... 198/473.1 |
| 7,007,793 | B2 | * | 3/2006 | Stocchi ..................... 198/473.1 |
| 7,398,871 | B1 | | 7/2008 | Basgil et al. |
| 7,967,127 | B2 | * | 6/2011 | Spence et al. .............. 198/459.2 |
| 8,418,836 | B2 | * | 4/2013 | Papsdorf ................... 198/480.1 |

FOREIGN PATENT DOCUMENTS

| | | |
|---|---|---|
| GB | 867372 A | 5/1961 |
| GB | 2 406 321 A | 3/2005 |
| JP | 10 035879 A | 2/1998 |
| JP | 2005-298105 A | 10/2005 |
| WO | WO 2005/030616 A | 4/2005 |
| WO | WO 2006/131463 A1 | 12/2006 |

OTHER PUBLICATIONS

Written Opinion for International Appl. No. PCT/GB2008/003250 mailed Apr. 1, 2010.

International Search Report and Written Opinion from International Patent Application No. PCT/GB2008/003250, filed Sep. 24, 2008.

Search Report from GB0718658.8, filed Sep. 24, 2007.

* cited by examiner

ADJUSTABLE STAR WHEEL

CROSS REFERENCE TO RELATED APPLICATIONS

This application is a national stage application filed under 35 U.S.C. 371 of International Application No. PCT/GB2008/003250, filed Sep. 24, 2008, which claims priority from Great Britain Application No. 0718658.8, filed Sep. 24, 2007.

FIELD OF THE INVENTION

The present invention relates to an adjustable star wheel for use with containers being processed on an automated handling line.

BACKGROUND TO THE INVENTION

Star wheels are used on various types of automated handling lines to convey containers to and from, and within, various machines such as rotary packaging machines. In particular, star wheels are used to convey containers between rectilinear conveyors to a rotating machine part and back to a rectilinear conveyor. The star wheel may take a container from a conveyor such as screw feed and pass the container to a machine such as a washer, filler, capper or labeller. Sometimes, orientation of the container is important and the star wheel may assist in ensuring that the container adopts the correct orientation.

Star wheels derive their name from the shape of one of their type: members of this type are generally disc shaped and their periphery contains a plurality of recesses or pockets thereby forming an approximate star-shape. The star wheels rotate about a central axis.

As mentioned above, recesses may be provided in the peripheries of the discs to form pockets for receiving containers therein. The star wheel is positioned on an automated handling line so that a container travelling down the handling line is received within a pocket as the star wheel rotates. For example, this may be effected by synchronising rotation of the star wheel with that of a screw feed, such that the screw feed delivers containers to a pick up point as a pocket moves through the pick up point. The container is retained within (and hence conveyed by) the pocket as the star wheel rotates, often by virtue of a guide rail provided to face the periphery of the star wheel, before being passed on to a subsequent machine part at a defined hand off point. Containers are generally retained by the pocket supporting the container between a pair of contact surfaces that urge the container against a guide rail that encircles at least part of the star wheel's periphery.

Star wheels may be used with a variety of containers that include bottles, cans and tins, although it will be realised that this list is not exhaustive. Moreover, it is often the case that more than one type of container will be processed on any particular handling line. For example, it is common to process containers relating to different pack sizes of a product such as 35 cl and 70 cl drinks bottles. Accordingly, it is advantageous for a star wheel to be adjustable so as to accommodate different sizes of container and/or different shapes of container.

In addition to a general requirement to accommodate containers of differing shapes and sizes, it is often important to preserve the position of the opening of a bottle. For example, the container may be a bottle with a narrow neck that is presented to a filling machine that generally has a filler head located in a fixed position: when the bottle is presented to the filler head, the neck of the bottle must be on the correct path such that its opening passes exactly beneath the filler head. Thus, it is important that the star wheel conveys containers such that their openings follow a predetermined path.

In the past, each star wheel could only handle containers of a specific shape and size, and this meant having to change the star wheel each time a different container was introduced onto a handling line. This is undesirable as it is both time consuming and necessitates having to keep a stock of different-sized star wheels. Attempts have been made to overcome this problem.

EP-A-0,412,059 describes an adjustable conveyor comprising a star wheel with upper and lower tiers that each comprise a disc with a periphery having formed therein a plurality of recesses. The size and shape of these recesses is fixed, and they define part-circles. A container is received partly within each recess. A radially adjustable pushrod is also provided in each recess. The pushrod defines a pocket having a back joined to respective sides by angled faces. In a first position, a relatively large container is supported by the recessed discs and the pushrod. Adjustment for smaller containers is possible in that the pushrods may be pushed into their respective recesses. When the pushrod is extended into a recess, the recessed disc no longer supports the container. Instead the container is supported only by the pushrod.

However, the shape of the pushrod means that only two points of contact are provided to support the container, namely between the container and each of the angled faces at the back of the pocket. In addition, support is provided at only one level and this permits greater movement of the containers away from the vertical. Also, the shape of the pocket defined by the pushrod must complement the shape defined by the recesses in the disc. This constraint on the shape of the pocket means that it cannot be tailored to match closely the shape of a container: in fact, it must have a shape that allows it to accommodate a range of containers according to the pushrod's range of movement.

EP-A-0,355,971 describes an adjustable star wheel. Rather than having a recessed disc to provide pockets, the star wheel uses a plurality of radially-adjustable pushrods that are connected to pivoting fingers. Accordingly, each pocket is defined at its back by the end of the pushrod and at its side by the finger. As the pushrod is moved radially in and out, the finger pivots to assist in defining a correspondingly smaller or larger pocket. As such, the pocket only provides two points of contact to support a container, and these points of contact are provided at one level. By its vary nature, the pocket cannot be closely matched to the shape of a container to be accommodated in the pocket.

Japanese Patent Application No. 10-35879 describes a star wheel having a tier defined by a pair of stacked discs. Each disc is provided with a plurality of fingers. A corresponding number of pockets are defined by pairs of fingers: a finger from one disc forms one side of the pocket and a finger from the other disc forms the other side of the pocket. The two discs may be rotated relative to each other so as to change the width of the pocket. However, the shape of the pocket is a composite formed in part by one of the discs and in part by the other of the discs. As such, the shape cannot be tailored to match a container with which the star wheel is designed to work.

SUMMARY OF THE INVENTION

Against this background, and from a first aspect, the present invention resides in an adjustable star wheel for conveying containers around an arcuate or curved path. The star wheel is rotatable about a central axis and is provided with at least one interchangeable pocket for receiving a container to be conveyed. The star wheel comprises: a peripheral portion defining a larger pocket of fixed shape and size; moveable jaws defining therebetween a smaller pocket having a fixed shape and size; an actuator disc rotatable about the central axis; and a cam mechanism linking the jaws to the actuator disc such that rotation of the actuator disc causes substantially radial movement of the jaws between an extended position and a retracted position. The star wheel is arranged such that, in the extended position, the jaws move the smaller pocket into coincidence with the larger pocket thereby configuring the star wheel to receive containers in the smaller pocket and, in the retracted position, the jaws are clear of the larger pocket thereby configuring the star wheel to receive containers in the larger pocket.

Thus a simple star wheel is realised that may be readily adjusted between a first setting where larger containers may be conveyed using the larger pocket, and a second setting where smaller containers may be conveyed using the smaller pocket. Furthermore, the present invention employs a different approach to that commonly found in conventional adjustable star wheels. In the past, adjustable star wheels use a common structural member to define a pocket for various sized containers. This may be one or more fingers that rotate to define a pocket of varying size (like EP-A-0,355,971) or jaws having a shape that is so general as to fit a range of container sizes (like EP-A-0,412,059). In both cases, the shape of the structure defining the pocket is not optimal for any particular container, but instead represents a compromise that will work adequately with a number of container sizes.

In contrast, the present invention proposes a different approach. Interchangeable pockets are provided where jaws that define a smaller pocket are moveable relative to a larger pocket. In one setting, the jaws are entirely clear of the larger pocket such that the larger pocket is free to receive containers. In another setting, the jaws are moved such that the smaller pocket they define coincides with the larger pocket. However, the smaller size of the smaller pocket means that it will act as the support for a container received by the star wheel.

Such an arrangement is advantageous because it allows the shape and size of the larger pocket and/or the smaller pocket to be tailored to exactly the container they are to receive. As a result, more than two points of support may be provided or an extended line of contact may be provided. Hence, a bespoke pocket may arise that meets the needs of a container exactly. For example, the shape of the pocket may correspond to that of the part of the container supported by the pocket. Alternatively, the pocket may be shaped to be close to that of the container, but may include portions that leave a little clearance such that the container may rotate slightly as it is received within the pocket and as it is released from the pocket. In fact, the pockets may be shaped to assist these feed in and hand off processes.

The larger and smaller pockets may be shaped advantageously in many different ways. For example, the larger and/or smaller pocket may comprise an arcuate rear supporting surface extending between supporting sides. Further, the width defined between the supporting sides of the smaller pocket may be less than that of the larger pocket. Alternatively the width may be the same, but the depth of the pocket to the arcuate back supporting surface may be less in the smaller pocket than in the larger pocket. The different depths of pocket may also be used in conjunction with different widths. Also, the curvature of the arcuate back supporting surface may be shallower in the smaller pocket than in the larger pocket.

The star wheel may be provided with a pocket-defining disc, of which the peripheral portion is part. In some embodiments, this pocket-defining disc is provided with a series of peripheral recesses that define a plurality of interchangeable pockets, as will be described in more detail below. Also, the pocket-defining disc may correspond to a tier of the star wheel, a further pocket-defining disc providing a further, spaced tier. Hence, containers may be supported at two levels (or more if further tiers are provided). Such tiered arrangements are described in further detail below.

Preferably, the actuator disc is rotatable relative to the pocket-defining disc. Optionally, the cam mechanism comprises a pin and slot arrangement. The slot may extend diagonally with respect to the radial and circumferential directions of the star wheel. The pin may be provided on the jaws and the slot may be provided on the actuator disc, or vice versa. Other mechanisms are also envisaged. For example, a cam linkage may be provided to link the jaws with the actuator disc.

In order to constrain the jaws to move substantially radially between the retracted and extended positions, it is preferred for the star wheel to comprise guide means associated with the pocket-defining disc. In a preferred embodiment, the jaws are received within a channel formed in the pocket-defining disc and the channel is shaped so as to provide the guide means. For example, the shape of the channel may correspond to the shape of the jaws by being elongate in the radial direction.

Optionally, the star wheel may comprise a cladding plate attached to the pocket-defining disc and arranged such that at least part of the jaws are sandwiched between the pocket-defining disc and the cladding plate. Such an arrangement helps to retain the jaws in position. Preferably, all of the jaws are sandwiched between the pocket-defining disc and the cladding plate when the jaws are in the retracted position. With this arrangement, the cladding plate may be provided with a corresponding shape to the peripheral portion of the pocket-defining disc, such that the larger pocket is defined by both the cladding plate and the pocket-defining disc. For example, the top of the larger pocket may be defined by the cladding plate and the bottom of the larger pocket may be defined by the pocket-defining disc. Then, the smaller pocket is defined by the jaws that extend from between the cladding plate and the pocket-defining disc.

The actuator disc may be constrained to rotate about the central axis by virtue of pin and slot arrangements that couple the actuator disc and the pocket-defining disc. The pins may be provided on the pocket-defining disc and the slots provided in the actuator disc, or vice versa. The pins may have a mushroom shape (i.e. a head enlarged relative to the slot width) so as to retain the actuator disc to the pocket-defining disc. The length of the slots define the range of movement of the actuator disc relative to the pocket-defining disc. Hence, the length of these slots may be chosen to set the required extended and retracted positions.

Clearly, it is desirable to be able to fix the star wheel into the two positions. To this end, the star wheel may further comprise a fixing mechanism to fix the position of the actuator disc relative to the pocket-defining disc. For ease of operation, the fixing mechanism may be a spring plunger to allow one-handed operation. For example, one hand may be used to release the spring plunger and then to turn the actuator disc using the spring plunger. Alternatively, a handle may be further provided to allow fixing/releasing and rotation as a two-handed operation.

Optionally, the star wheel may comprise a further set of moveable jaws defining therebetween a still smaller pocket having a fixed shape and size; a further actuator disc rotatable about the central axis; and a further cam mechanism linking the further jaws to the further actuator disc such that rotation of the further actuator disc causes substantially radial movement of the further jaws between an extended position and a retracted position. Similar to what has been described above, in the extended position, the further jaws hold the still smaller pocket in coincidence with the larger pocket thereby configuring the star wheel to receive containers in the still smaller pocket. When both the jaws and the further jaws are in the retracted position, the jaws and the further jaws are both clear of the larger pocket thereby configuring the star wheel to receive containers in the larger pocket. Hence, the basic idea behind the present invention may be extended to provide a star wheel capable of accepting three sizes of containers.

Preferably, the jaws and further jaws are arranged on opposed faces of the pocket-defining disc. For example, channels may be provided in opposed faces of the pocket-defining disc, one channel receiving the jaws and the other channel receiving the further jaws.

In most applications, the star wheel will convey more than one container of the same size at a time and will adopt the familiar arrangement of providing a plurality of peripheral pockets. Advantageously, each of the pockets may be an interchangeable pocket as described above. For example, a pocket-defining disc may be provided with a periphery provided with a plurality of recesses, thereby defining a series of larger pockets. The larger pockets may have a uniform size and shape. Each of the pockets may have associated moveable jaws defining therebetween a smaller pocket having a fixed shape and size that is common to all pockets. A single actuator disc may be provided that is rotatable about the central axis to effect movement of all the jaws. Each pocket may have a cam mechanism linking the jaws to the actuator disc such that rotation of the actuator disc causes substantially radial movement of all the jaws between their extended positions and their retracted positions. In the extended positions, all jaws move such that the smaller pockets they define coincide with their associated larger pocket thereby configuring the star wheel to receive containers in the smaller pocket. In their retracted positions, the jaws are clear of the larger pockets thereby configuring the star wheel to receive containers in the larger pockets.

In this way, only a single operation is required to convert all the pockets in the star wheel between the larger and smaller positions. Hence, a star wheel is provided that very quickly converts from conveying a plurality of larger containers to a plurality of smaller containers.

The cam mechanism of each interchangeable pocket may comprise a pin and slot arrangement, the slot extending diagonally with respect to the radial and circumferential directions of the star wheel. One of the pin and slot is provided on the jaws of the pocket and the other of the pin and slot is provided on the actuator disc.

As mentioned above, more than a single tier may be provided. For example, the peripheral portion of the star wheel that defines the larger pocket, the moveable jaws that define the smaller pocket, the actuator disc and the cam mechanism may all be part of a first tier. The star wheel may then comprise a second, like tier spaced apart from the first tier. This would provide support to containers at two levels. Where a container has a constant cross-section (or a cross-section that is the same at two levels), the size and shape of the pockets defined by the first and second tiers may correspond. However, the size and/or shape of the pockets defined by the first and second tiers need not correspond. For example, a lower tier may support the body of a bottle while the upper tier may support a narrowed neck.

Additional tiers may be provided to allow still further sizes of containers to be accepted by the star wheel. For example, a tier (or pair of tiers if two levels of support are desired) may be provided to define the larger pockets and with one or two sets of jaws to define smaller pockets. Further tiers may then provide jaws with further sizes and/or shapes of smaller pockets that may be extended or retracted. Preferably, each tier defines the same size and shape of larger pocket. A desired size of pocket may be selected by using the larger pockets, or extending a suitable set of jaws.

The present invention also extends to a conveyor assembly for conveying containers through an arcuate path, the assembly comprising any of the star wheels described above that defines the inside of the arcuate path, and an adjustable guide rail defining at least in part the outside of the arcuate path. The guide rail may be mounted on a holder and may be adjustable relative to the holder to allow substantially radial movement of the guide rail between an inward position and an outward position. By making both the star wheel and the guide rail adjustable, different sized containers may be conveyed with their centres following the same line along the arcuate path. Thus, an opening in the containers always follows a fixed path, irrespective of the size of the container. This may be achieved by arranging the assembly such that larger containers may be conveyed along the arcuate path when the star wheel is set to present the larger pocket and the guide rail is set to the outward position. Smaller containers may be conveyed along the arcuate path when the star wheel is set to present the smaller pocket and the guide rail is set to the inward position. The midpoint between the pocket and the guide rail is the same irrespective of whether the assembly is set to convey larger or smaller containers.

It will be appreciated that combinations of the features described above results in a star wheel that provides an easy and quick method of converting between larger and smaller containers. No spare parts are required and the star wheel need not be removed. Change of containers on a handling line merely requires a single rapid adjustment of each star wheel from one preset position to the other.

BRIEF DESCRIPTION OF THE DRAWINGS

In order that the invention can be more readily understood, reference will now be made by way of example only, to the accompanying drawings in which.

DETAILED DESCRIPTION OF THE INVENTION

Figure 1:
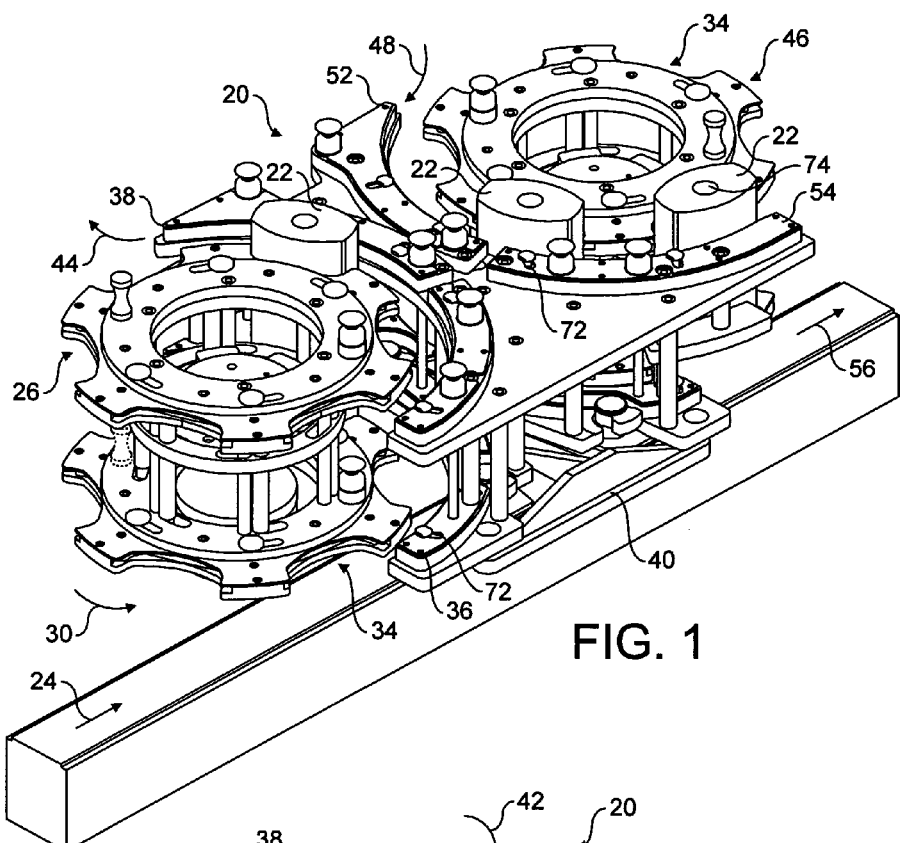
FIG. 1 is a perspective view of a conveyor assembly according to an embodiment of the present invention.
Figure 2:
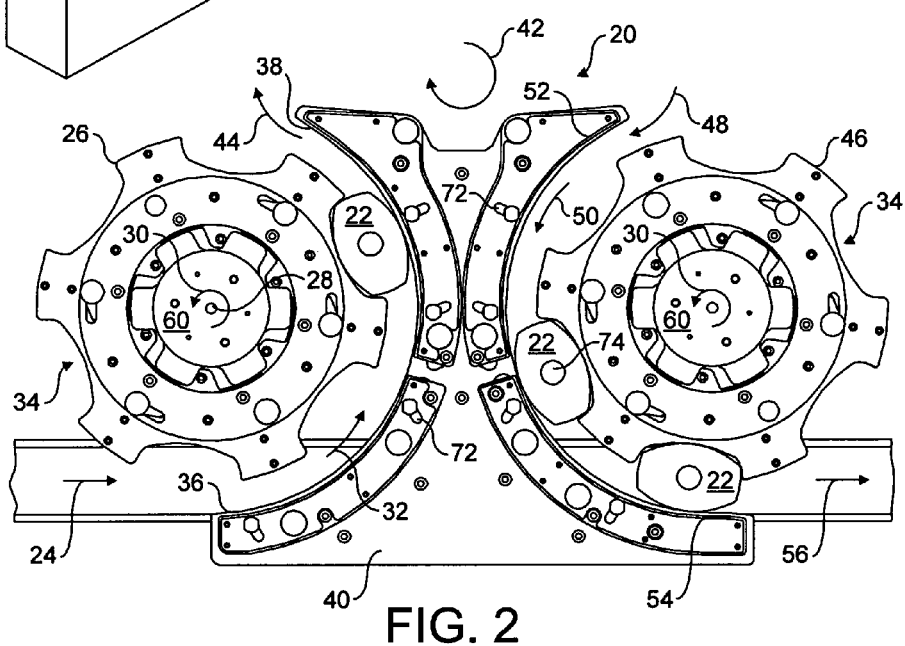
FIG. 2 is a plan view of the conveyor assembly of FIG. 1.

A conveyor assembly 20 is shown in perspective in FIG. 1 and in plan in FIG. 2. The conveyor assembly 20 is used to divert containers 22 from a rectilinear path and feed the containers 22 into a rotary machine (not shown) for processing such as filling or labelling. The conveyor assembly 20 then takes processed containers 22 from the rotary machine and passes them back onto the rectilinear path.

The conveyor assembly 20 first takes containers 22 arriving along a linear input path denoted by arrow 24. A first star wheel 26 rotates about a central axis 28 as shown at 30 so as to convey containers 22 along the path shown at 32. Containers 22 are received within pockets 34 defined around the periphery of star wheel 26. The containers 22 are then urged along the path 32 as constrained by the combination of the pockets 34 and guide rails 36 and 38 provided on a guide rail assembly 40.

The containers 22 are released at a hand off position where they are received by a rotary machine (not shown). The rotary machine rotates in the sense shown at 42 such that the containers 22 follow the path shown at 44. The rotary machine may perform one of the functions already described, e.g. clean, fill, cap or label the containers 22. The rotary machine delivers the containers 22 to a further hand off position where they feed into a second star wheel 46 along path 48. The second star wheel 46 corresponds to the first star wheel 26, and so the following detailed description of star wheel 26 applies equally well to star wheel 46. The containers 22 are received within pockets 34 of the second star wheel 46 to be conveyed along path 50, as constrained by the combination of pockets 34 and guide rails 52 and 54. The guide rails 52 and 54 are part of the guide rail assembly 40 and correspond to guide rails 36 and 38. Guide rails 36, 38 and 52, 54 form back-to-back pairs.

The second star wheel 46 releases the containers 22 at a hand off position so that the containers 22 follow a linear output path denoted by arrow 56.

Star wheel 26 is shown in more detail in FIGS. 3 to 6. As noted above, star wheel 46 is identical to star wheel 26. Star wheel 26 has a hollow bore 58 shaped so as to fit on and be driven by a shaft 60. Thus, rotation of the shaft 60 drives rotation of the star wheel 26.

Star wheel 26 comprises a pair of tiers 62 and 64, one upper 62 and one lower 64. Each tier 62, 64 is generally disc like and has a periphery provided with a series of six identical and equi-spaced recesses that define the pockets 34. The pockets 34 are carefully shaped to match closely the shape of the containers 22 they are to receive. The precise shape is tailored to leave some clearance to allow each container 22 room to twist slightly as it is received within and is released from the pocket 34.

The tiers 62, 64 are linked by a series of pillars 66 that attach to a centre ring 67. The centre ring 67 provides the shaped bore 58 that cooperates with the shaft 60. Accordingly, upper and lower tiers 62, 64 are coupled together and to the centre ring 67 such that they all rotate in unison.

Figure 7:
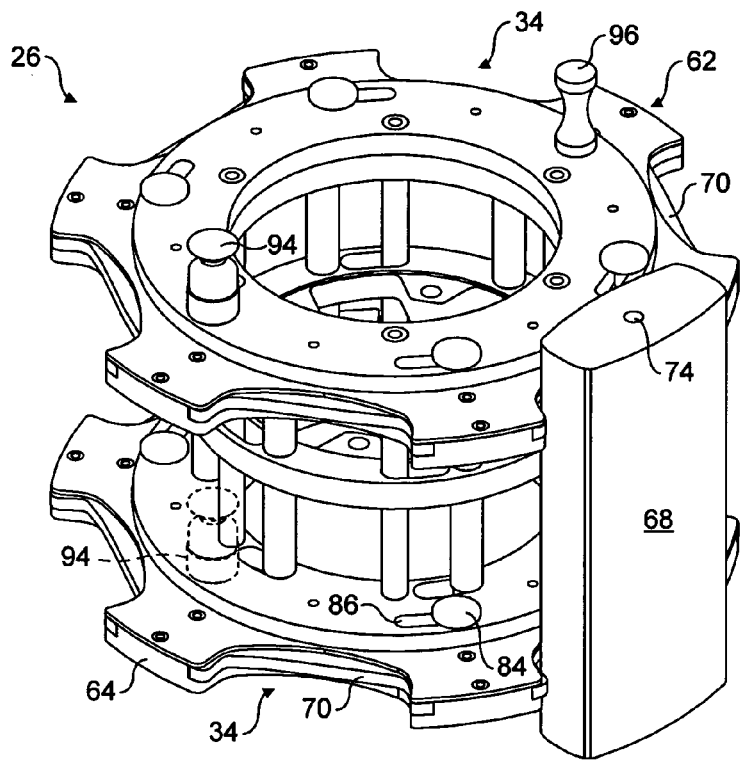
FIG. 7 is a perspective view of the star wheel of FIG. 1 adjusted so as to accommodate smaller containers.
Figure 8:
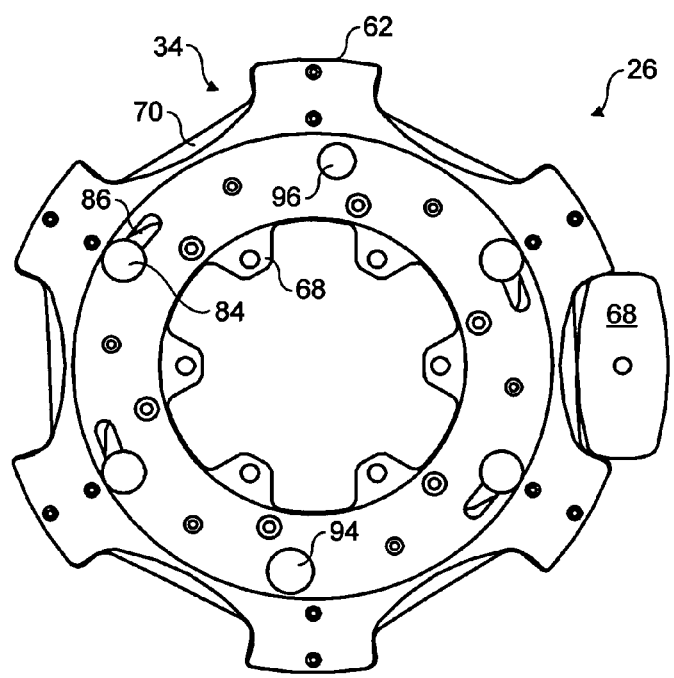
FIG. 8 is a plan view of the star wheel of FIG. 3 adjusted so as to accommodate the smaller containers.

The star wheel 26 of FIGS. 3 to 6 is provided with an adjustment mechanism that allows the star wheel 26 to be used with smaller containers 68. FIGS. 7 and 8 show the star wheel 26 supporting such a smaller container 68. In order to support the smaller container 68 correctly, the size and shape of the pockets 34 are redefined by jaws 70 that move into the recesses defined by each tier 62, 64. When the larger containers 22 are being conveyed, the jaws 70 are retracted so as to leave the pockets 34 clear. In this retracted position, the pockets 34 are solely defined by the recesses provided in each tier 62 and 64.

Each jaw 70, when extended, presents an opening that is smaller than the recesses in the tiers 62 and 64, thereby defining the smaller pockets 34 as best seen in the plan view of FIG. 8. The openings in the jaws 70 are carefully shaped to match closely the shape of the smaller containers 68 they are to receive, in much the same way as the recesses in the tiers 62 and 64. The precise shape of the opening is tailored to leave some clearance to allow each container 68 room to twist slightly as it is received within and is released from the pocket 34. Hence, pockets 34 are provided that are bespoke to each size of container 22 and 68 to be conveyed.

In addition to moving the jaws 70 into the recess 34, the guide rails 36, 38 are also moved inwardly to preserve the centreline of travel through the conveyor assembly 20. The guide rails 36, 38 are mounted via pin and slot arrangements 72 to provide the desired radial movement as best seen in FIGS. 1 and 2. The guide rails 36, 38 adopt a first position spaced further away from the star wheel 26 when conveying the larger containers 22, and a second position spaced closer towards the star wheel 26 when conveying the smaller containers 68. The positions of the pockets 34 and the guide rails 36, 38 are carefully chosen such that the central opening of the containers 22 and 68 is conveyed along the same line through the conveyor assembly 20. Put another way, correct positioning of the recesses 34 and guide rails 36, 38 ensures that there is no offset between the openings of the large containers 22 and small containers 68. As will be clear, this combination of adjustable star wheel 26 and adjustable guide rails 36, 38 is mirrored in the combination of star wheel 46 and guide rails 52, 54.

The mechanism that allows adjustment of the jaws 70 is shown in more detail in FIGS. 9 to 12 that show the star wheel 26 partially dismantled. The upper and lower tiers 62, 64 have broadly corresponding designs, so the following description of the upper tier 62 applies equally well to the lower tier 64.

Figure 3:
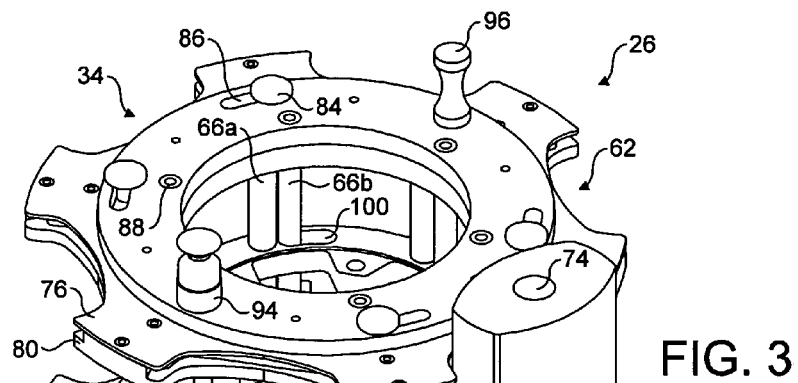
FIG. 3 is a perspective view of a star wheel of the conveyor assembly of FIG. 1.
Figure 4:
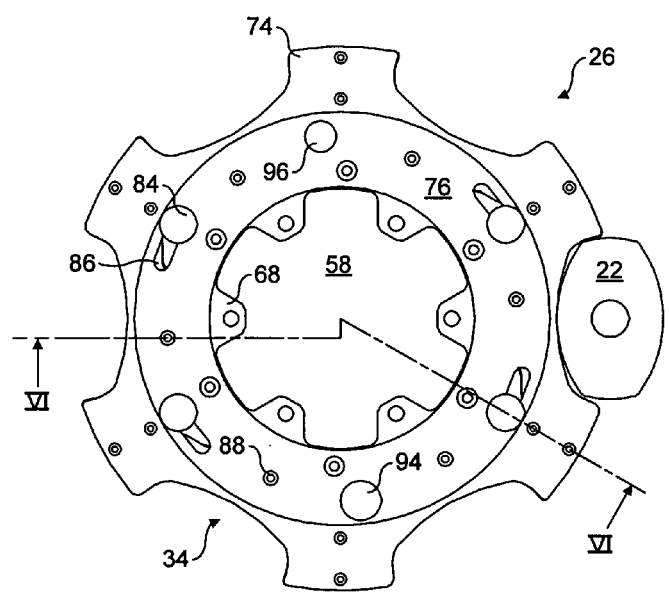
FIG. 4 is a plan view of the star wheel of FIG. 3.
Figure 5:
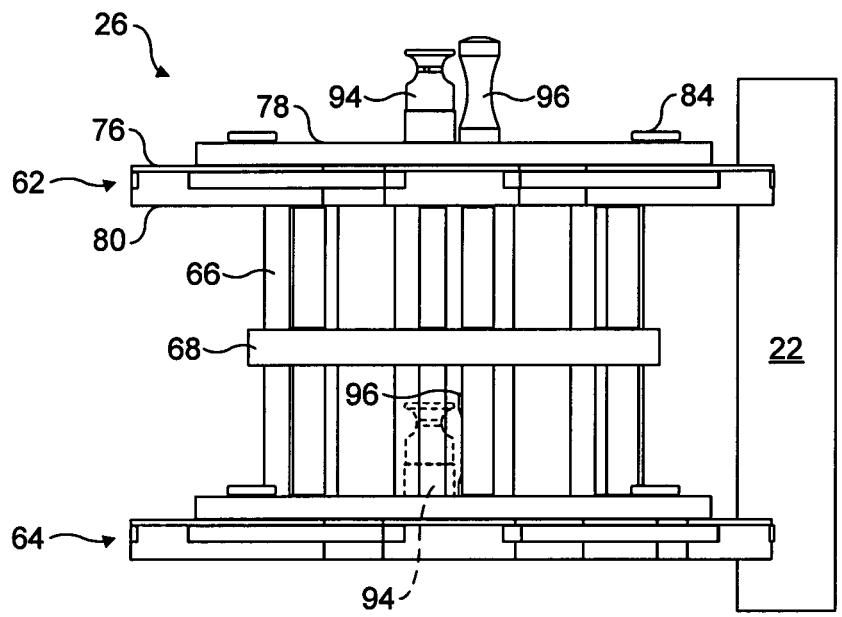
FIG. 5 is a side view of the star wheel of FIG. 3.
Figure 6:
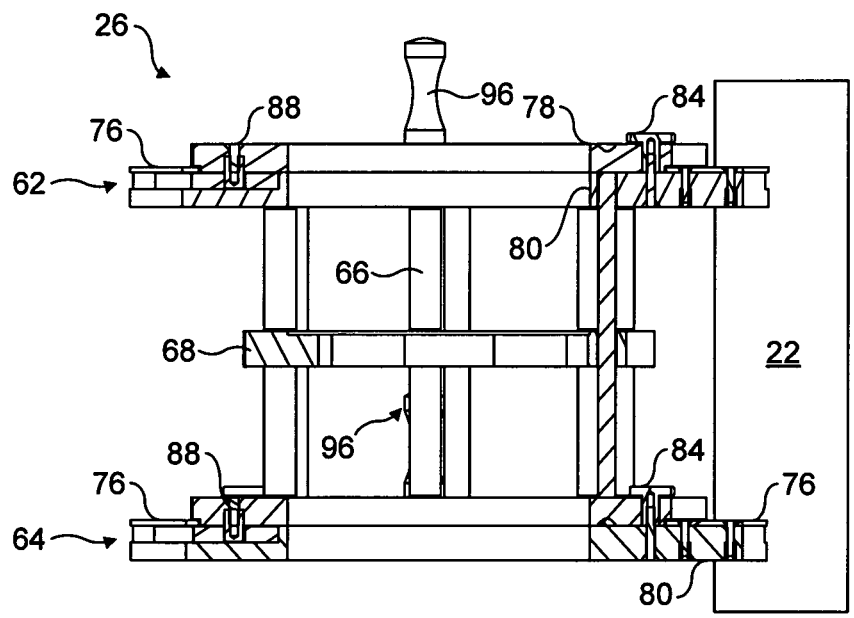
FIG. 6 is a section along line VI-VI of FIG. 4.

As can be best seen in FIGS. 3 and 7, the upper tier 62 comprises a metal cladding plate 76 and a ring plate 78. The ring plate 78 sits on top of the cladding plate 76 and is not fixed thereto so as to allow rotation of the ring plate 78 relative to the cladding plate 76. A tier main plate 80 is fixed to the cladding plate 76 and the jaws 70 are sandwiched therebetween.

Figure 9:
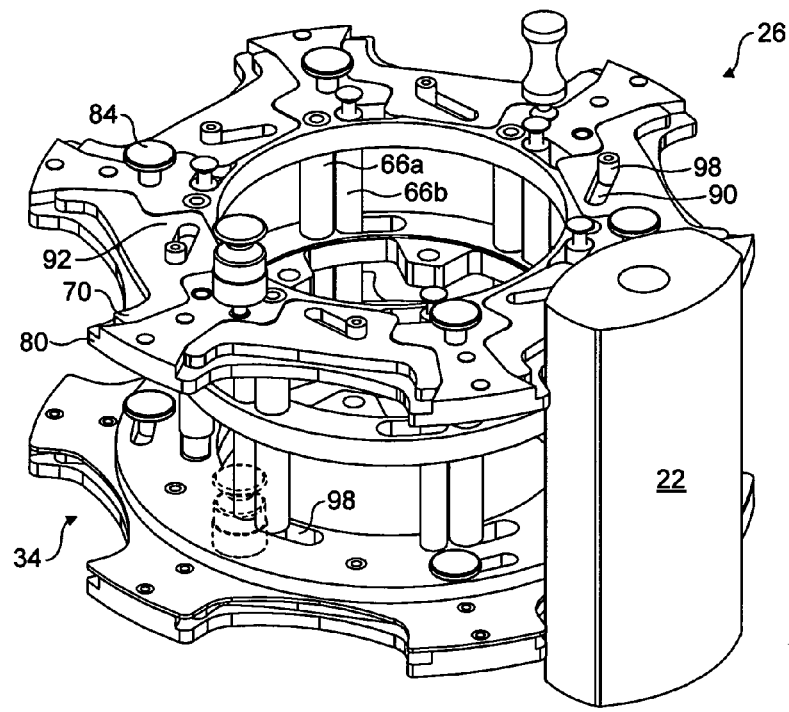
FIG. 9 is a perspective view of the star wheel of FIG. 3 with the ring plate and cladding plate removed to show the adjustment mechanism.
Figure 10:
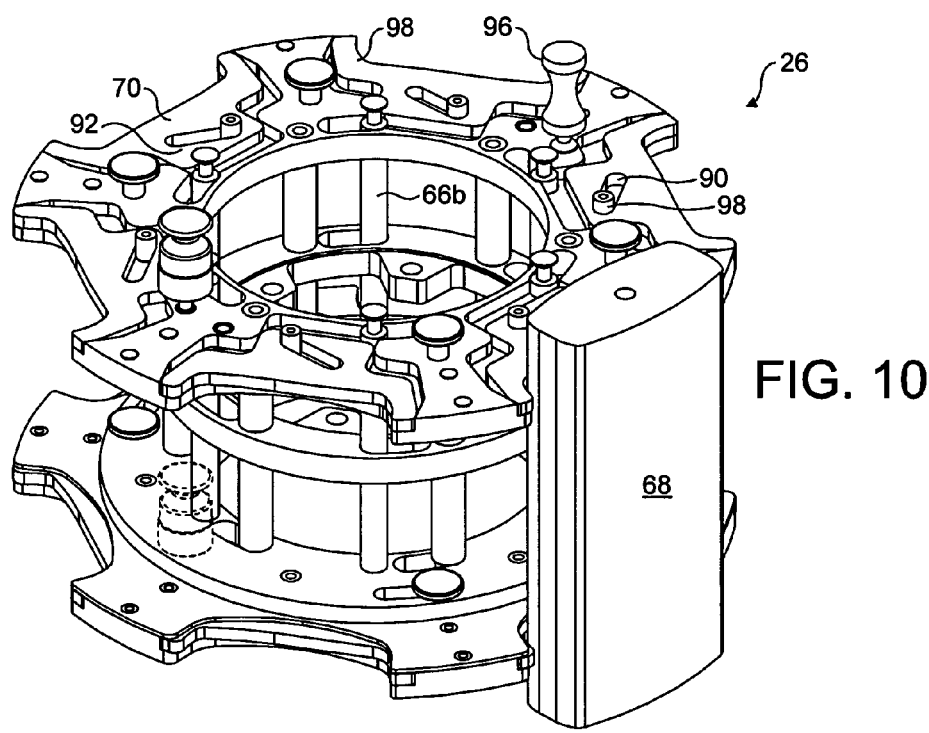
FIG. 10 corresponds to FIG. 9 but with the star wheel adjusted so as to accommodate the smaller containers.
Figure 11:
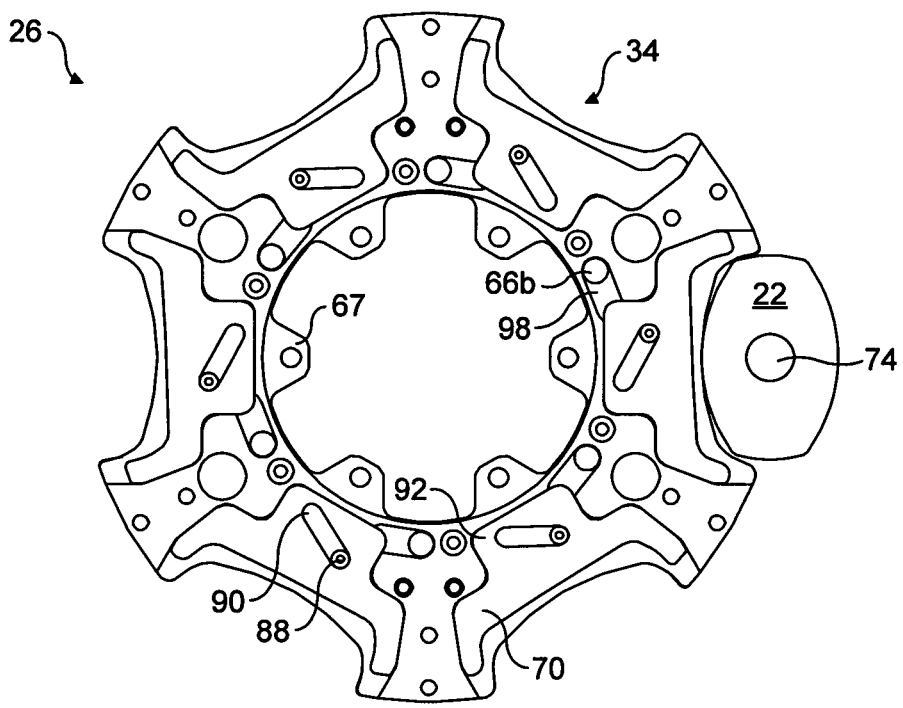
FIG. 11 is a plan view of the star wheel shown in FIG. 9.
Figure 12:
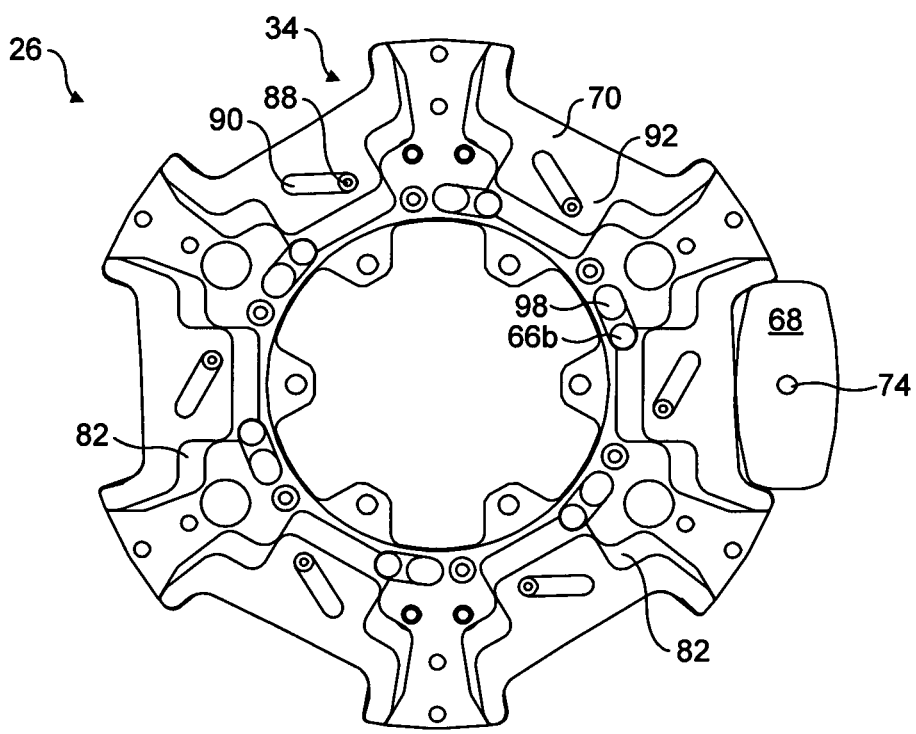
FIG. 12 is a plan view of the star wheel shown in FIG. 10.

As can be seen in FIG. 9, the tier main plate 80 has a series of radial channels 82 formed about its periphery to accommodate the jaws 70. These channels 82 are shaped so as to provide a guide for the jaws 70 that constrains the jaws 70 to move in the desired radial direction while preserving the desired orientation of the jaws 70. Movement of the jaws 70 is effected by the relative rotation of the ring plate 78 and the cladding plate 76. A series of mushroom-shaped pins 84 extend upwardly from the cladding plate 76 to pass through guide slots 86 provided in the ring plate 78. The shape of the pins 84 is so as to retain the ring plate 78 in position on the cladding plate 76. The combination of the mushroom pins 84 and the guide slots 86 constrains the ring plate 78 to rotate about the central axis 28 of the star wheel 26.

A series of cam pins 88 depend from the ring plate 78 and are received within diagonal cam slots 90 provided in a rear tab 92 of the jaws 70. Thus, as the ring plate 78 is rotated relative to the cladding plate 76, the cam pins 88 are driven along the cam slots 90 provided in the jaws 70 to produce the desired radial translation: the shape of the channels 82 constrains the jaws 70 to move radially as the cam pins 88 are urged along the cam slots 90. The length of the guide slots 86 and the length and angle of the cam slots 90 are chosen such that movement across the range of rotation of the ring plate 78 realises the required range of radial translation of the jaws 70. Hence, the minimum and maximum positions may be set to accommodate the large containers 22 and the small containers 68.

To effect a change in position, the ring plate 78 is first unlocked using a spring plunger mechanism 94. A knob 96 is provided on the ring plate 78 for ease of rotation. The knob 96 may be spaced apart from the spring plunger 94 such that one hand may be used to operate the spring plunger 94 and the other hand used to rotate the knob 96. Once the knob 96 has been moved such that the mushroom pins 84 complete their movement in the guide slots 86, the spring plunger 94 may be released such that star wheel 26 is fixed in the new position.

As mentioned above, the upper and lower tiers 62, 64 are joined by pillars 66 and a centre ring 67. A first set of pillars 66a join the tier main plate 80 of the upper and lower tiers 62, 64. To allow rotation of the ring plates 78, guide slots 98 are also provided in the ring plate 78 through which the pillars 66a pass. These pillars 66a are also fixed to the centre ring 67. A second set of pillars 66b join the ring plate 78 of the upper tier 62 to that of the lower tier 64. These pillars 66b pass through the centre ring 67. As the centre ring 67 is fixed to the pillars 66a that link the tier main plates 80, slots 100 are provided in the centre ring 67 to allow the pillars 66b linking the ring plates 78 to pass therethrough. This couples the ring plates 78 together such that use of the spring plunger mechanism 94 and knob 96 causes rotation of both ring plates 78 in unison. Hence, the pockets 34 of the upper and lower tiers 62, 64 may be adjusted between larger and smaller sizes in a single action.

Accordingly, a simple design is achieved that provides quick and easy adjustment between two container sizes without requiring removal of the star wheel 26, 46 or a stock of spare parts.

Other variations to the embodiment described above are possible without departing from the scope of the invention defined by the claims.

For example, adjustment of the upper and lower tiers 62, 64 may be effected together or independently. Thus, upper and lower ring plates 78 may be coupled by pillars 66 or they may be left unconnected by splitting the pillars 66. A further spring plunger mechanism 94' and knob 96' may be provided for the lower tier 64, as shown in ghosted outline in the figures. The spring plunger mechanism and knob combinations 94/96 and 94'/96' may be used to adjust the pockets 34 of the respective tiers 62, 64 independently. Operation of the above star wheels 26, 46 has been described as movement between two settings that corresponds to the range of rotation of the ring plate 78 relative to the cladding plate 76. However, any position may be set using the spring plunger 94 that corresponds to an intermediate position in the rotation of the ring plate 78.

While the containers 22, 68 shown require the pockets 34 to be the same in both the upper and lower tiers 62 and 64, this need not be the case. For example, star wheels 26, 46 according to the present invention may be used to support a bottle at its body and at its neck. Thus the pockets 34 will be differently shaped and sized. Moreover, the range of movement of the jaws 70 need not be the same. For example, the change in position for the jaws 70 used to support a neck of a bottle may be less that that of the jaws 70 supporting the body. By correct design of the diagonal cam slots 90, coupled rotation of the ring plates 78 may be used to drive the upper and lower jaws 70 the required different distances. Alternatively, adjustment of upper and lower tiers 62, 64 may be independent.

In fact, different-sized bottles will not necessarily have different-sized necks. Thus, star wheels 26, 46 having only a single adjustable tier are envisaged. This adjustable tier may act on its own (i.e. without a second tier), or in conjunction with an non-adjustable tier.

The above described star wheels 26, 46 are particularly envisaged for use on lines handling two different sizes of container 22, 68. As has been described, the use of the recessed tiers 62, 64 and jaws 70 allows the size or shape of the recesses formed to be exactly tailored to the requirements for the two sizes of containers required. This idea can be extended to accommodate three sizes of container very simply. The tiers 62, 64 described above comprise jaws 70 provided in the upper surface of the tier main plate 80 and sandwiched beneath the lower surface of a cladding plate 76. However, a second series of jaws 70 may be provided for one or both tiers 62, 64 using the opposite side of the tier main plate 80. For example, a second series of channels 82 may be provided in the lower surface of the tier main plate. 80 to house a second set of differently sized and/or shaped jaws 70. A lower cladding plate 76 may be used to sandwich the jaws 70. A spring plunger 94 and knob 96 may extend downwardly to allow adjustment of the lower jaws 70. Hence, three different types of containers may be used with the star wheel 26, 46 corresponding to (1) both sets of jaws 70 being retracted and hence clear of the recesses formed in the tiers 62, 64; (2) the upper set of jaws 70 being extended and the lower set of jaws 70 being retracted; and (3) the lower set of jaws 70 being extended and the upper set of jaws 70 being retracted. If the smallest pocket 34 defined by one set of the jaws 70 fits entirely within the medium pocket 34 defined by the other set of jaws 70, the other set of jaws 70 need not be retracted (i.e. both may be left extended).

A common drive mechanism may be used with both sets of jaws 70 as follows. The ring plate 78 may be rotated relative to the cladding plate 76 between a start position, an intermediate position and a final position. Shaping the cam slots 90 allows the desired movement of the jaws 70 to be effected for each part of the movement. For example providing outwardly-pointing v-shaped cam slots 90 in one set of jaws 70 will cause the jaws 70 to extend between the start and intermediate positions and then to retract between the intermediate and final positions. Dog-legged cam slots 90 having a first leg in the circumferential direction and a second, diagonal leg can be used on the other set of jaws 70 to cause the jaws 70 to stay in the retracted position during rotation between start and intermediate positions and then to extend during rotation between intermediate and final positions. Indeed, the star wheels 26, 46 can be modified still further by providing further tiers 62, 64. Each tier 62, 64 may have different sets of jaws 70 provided allowing even more different types of containers 22, 68 to be accommodated. The recesses defined by the cladding plate 76 and main plate 80 are preferably the same at each tier 52 and 54, but each set of jaws 70 may provide a different size and shape of recess.

The invention claimed is:

1. An adjustable star wheel for conveying containers around an arcuate path, wherein the star wheel is rotatable about a central axis and is provided with at least one interchangeable pocket for receiving a container to be conveyed, the interchangeable pocket being interchangeable between a larger pocket and a smaller pocket and wherein the star wheel comprises:

a peripheral portion defining the larger pocket of the interchangeable pocket of fixed shape and size;

moveable jaws defining therebetween the smaller pocket of the interchangeable pocket having a fixed shape and size;

an actuator disc rotatable about the central axis; and a cam mechanism linking the jaws to the actuator disc such that rotation of the actuator disc causes substantially radial movement of the jaws between an extended position and a retracted position such that, in the extended position, the jaws move the smaller pocket into coincidence with the larger pocket thereby configuring the star wheel to receive containers in the smaller pocket, and, in the retracted position, the jaws are clear of the larger pocket thereby configuring the star wheel to receive containers in the larger pocket.

2. The star wheel of claim 1, wherein at least one of the larger and smaller pockets comprise an arcuate rear supporting surface extending between supporting sides.

3. The star wheel of claim 2, wherein the width defined between the supporting sides of the smaller pocket is less than that of the larger pocket.

4. The star wheel of claim 2, wherein the depth of the pocket to the arcuate back supporting surface is less in the smaller pocket than in the larger pocket.

5. The star wheel of claim 1, wherein the peripheral portion is part of a pocket-defining disc.

6. The star wheel of claim 5, wherein the actuator disc is rotatable relative to the pocket-defining disc.

7. The star wheel of claim 6, wherein the cam mechanism comprises a pin and slot arrangement, the slot extending diagonally with respect to the radial and circumferential directions of the star wheel, and wherein one of the pin and slot is provided on the jaws and the other of the pin and slot is provided on the actuator disc.

8. The star wheel of claim 7, wherein the pin extends from the jaws and the slot is formed in the actuator disc.

9. The star wheel of claim 6, further comprising guide means associated with the pocket-defining disc that is arranged to constrain the jaws to move substantially radially between the retracted and extended positions.

10. The star wheel of claim 9, wherein the jaws are received within a channel formed in the pocket-defining disc, and wherein the channel is shaped so as to provide the guide means.

11. The star wheel of claim 10, further comprising a cladding member attached to the pocket-defining disc and arranged such that at least part of the jaws are sandwiched between the pocket-defining disc and the cladding member.

12. The star wheel of claim 11, wherein all of the jaws are sandwiched between the pocket-defining disc and the cladding member when in the retracted position.

13. The star wheel of claim 12, wherein the cladding member has a shape that corresponds to the peripheral portion of the pocket-defining disc, such that the larger pocket is defined by both the cladding member and the pocket-defining disc.

14. The star wheel of claim 6, wherein the actuator disc is constrained to rotate about the central axis by virtue of pin and slot arrangements that couple the actuator disc and the pocket-defining disc.

15. The star wheel of any preceding claim, comprising:

a further set of moveable jaws defining therebetween a still smaller pocket having a fixed shape and size;

a further actuator disc rotatable about the central axis; and a further cam mechanism linking the further jaws to the further actuator disc such that rotation of the further actuator disc causes substantially radial movement of the further jaws between an extended position and a retracted position such that, in the extended position, the further jaws move the still smaller pocket into coincidence with the larger pocket thereby configuring the star wheel to receive containers in the still smaller pocket, and, when both the jaws and the further jaws are in the retracted position, the jaws and the further jaws are both clear of the larger pocket thereby configuring the star wheel to receive containers in the larger pocket.

16. The star wheel of claim 15, wherein the peripheral portion is part of the pocket defining disk, and the jaws and further jaws are arranged on opposed faces of the pocket-defining disc.

17. The star wheel of claim 5, further comprising a series of interchangeable pockets, wherein the peripheral portion is part of a pocket-defining disc, the pocket-defining disc being provided with a series of peripheral recesses thereby forming a series of larger pockets, and wherein each larger pocket has associated jaws.

18. The star wheel of claim 17, wherein a single actuator disc is provided that is rotatable relative to the pocket-defining disc, and the cam mechanism of each interchangeable pocket comprises a pin and slot arrangement, the slot extending diagonally with respect to the radial and circumferential directions of the star wheel, and wherein one of the pin and slot is provided on the jaws of the pocket and the other of the pin and slot is provided on the actuator disc.

19. The star wheel of claim 1, wherein the peripheral portion that defines the larger pocket, the moveable jaws that define the smaller pocket, the actuator disc and the cam mechanism are part of a first tier, and wherein the star wheel further comprises a second, like tier spaced apart from the first tier.

20. The star wheel of claim 2, wherein the width defined between the supporting sides of the smaller pocket is less than that of the larger pocket, and wherein the depth of the pocket to the arcuate back supporting surface is less in the smaller pocket than in the larger pocket.

* * * * *

UNITED STATES PATENT AND TRADEMARK OFFICE
CERTIFICATE OF CORRECTION

PATENT NO.        : 8,561,783 B2                                        Page 1 of 1
APPLICATION NO.   : 12/679418
DATED             : October 22, 2013
INVENTOR(S)       : McAllister et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 714 days.

Signed and Sealed this
Fifteenth Day of September, 2015

Michelle K. Lee
*Director of the United States Patent and Trademark Office*